(No Model.)  5 Sheets—Sheet 1.
D. F. STAMBAUGH.
WIRE COILING MACHINE.
No. 376,685.  Patented Jan. 17, 1888.
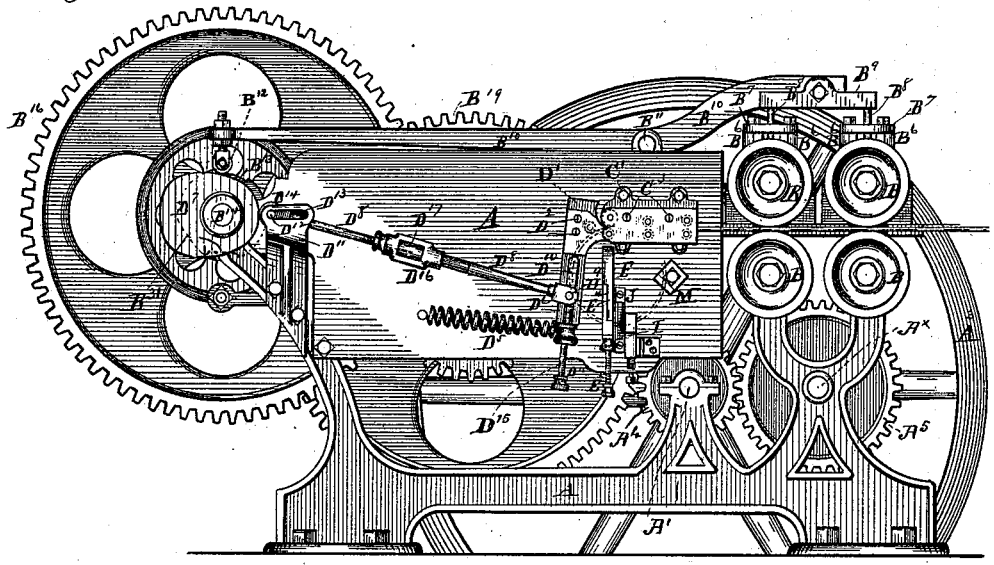
Fig. 1.
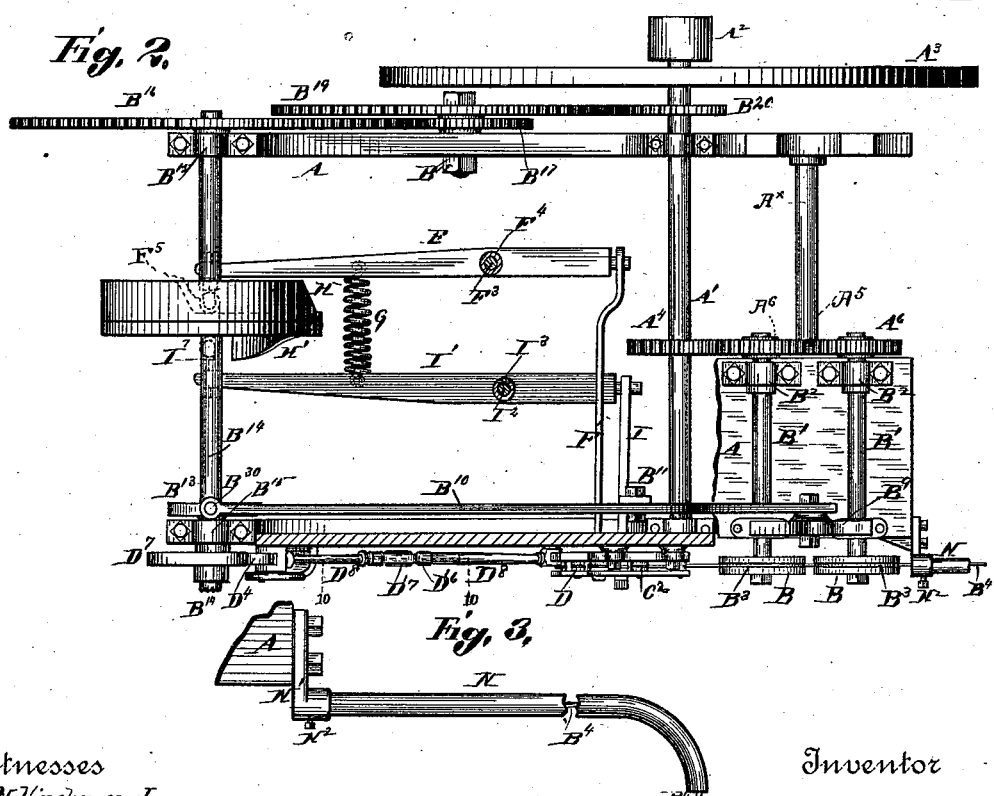
Fig. 2.
Fig. 3.
Witnesses
G. N. Hinchman Jr.
F. A. Hopkins
Inventor
David F. Stambaugh
By his Attorneys
Knight Bros

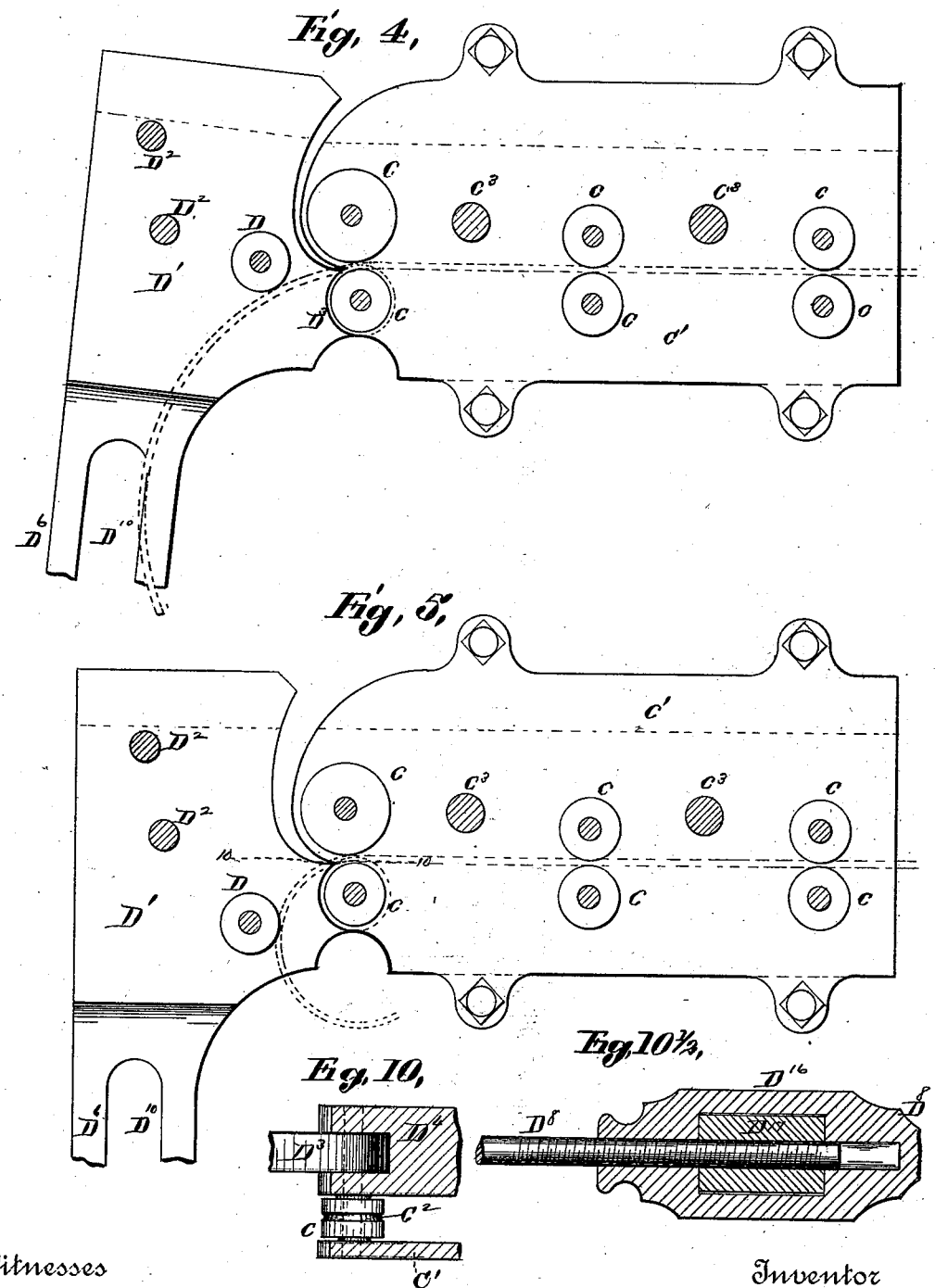

(No Model.) 5 Sheets—Sheet 3.
D. F. STAMBAUGH.
WIRE COILING MACHINE.
No. 376,685. Patented Jan. 17, 1888.
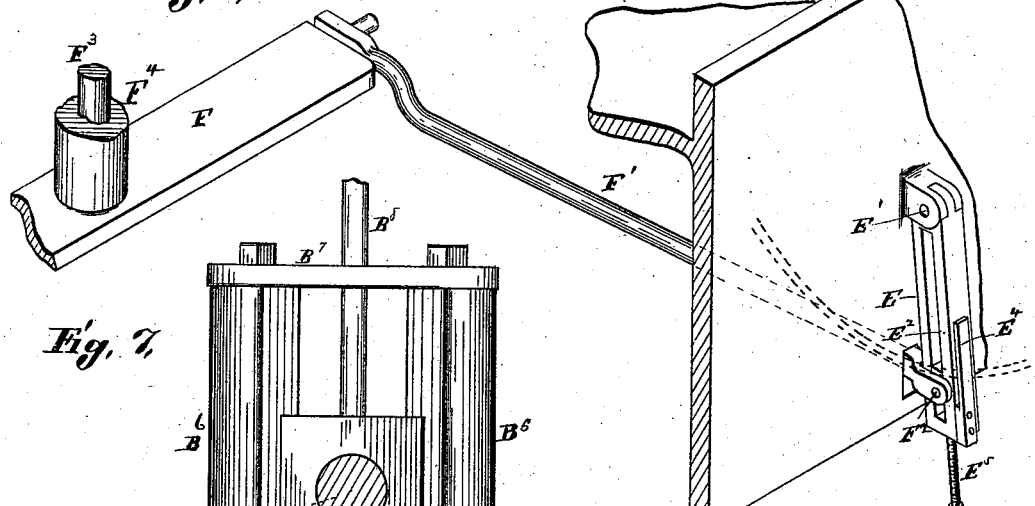
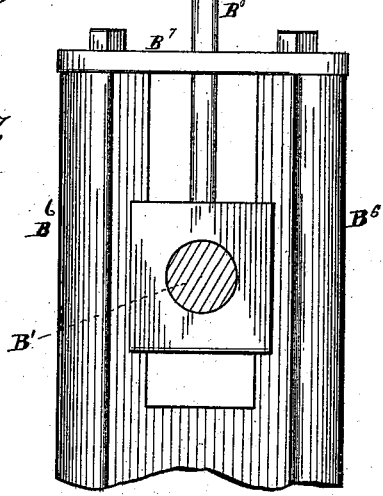
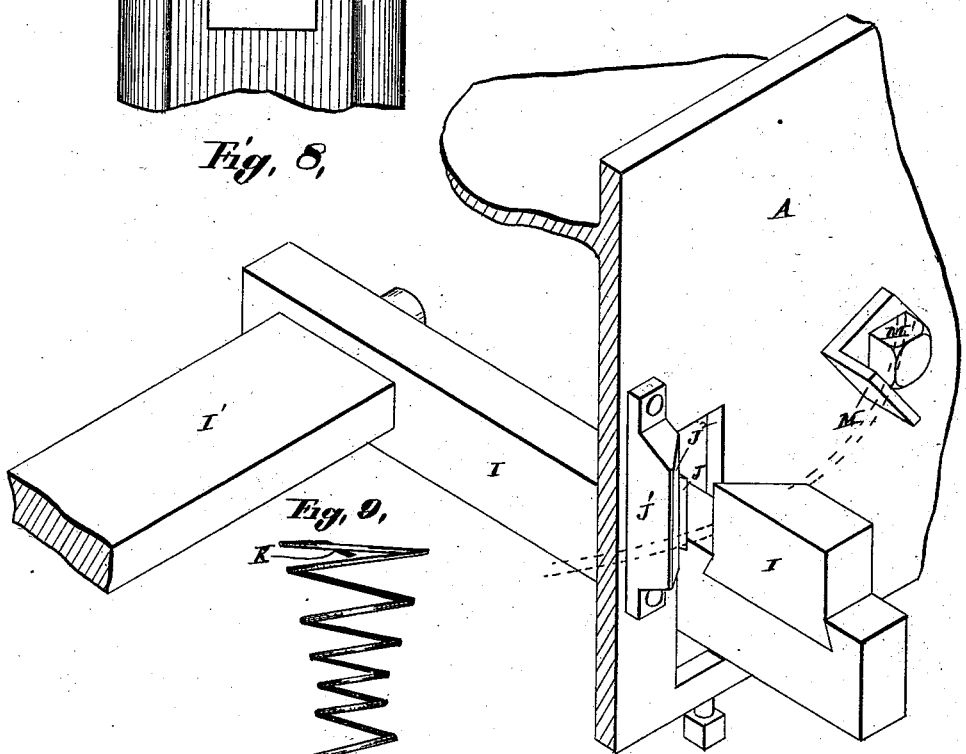
Witnesses
G. W. Hinchman Jr.
F. A. Hopkins
Inventor
David F. Stambaugh
By his Attorneys
Knight Bros (No Model.) 5 Sheets—Sheet 4.

D. F. STAMBAUGH.
WIRE COILING MACHINE.

No. 376,685. Patented Jan. 17, 1888.

Witnesses
f. A. Hopkins,
Geo. L. Wheelock.

Inventor
David F. Stambaugh.
By his Attorneys
Knight Bros (No Model.) 5 Sheets—Sheet 5.

D. F. STAMBAUGH.
WIRE COILING MACHINE.

No. 376,685. Patented Jan. 17, 1888.

Witnesses
F. A. Hopkins,
Geo. L. Wheelock.

Inventor
David F. Stambaugh.
By his Attorneys
Knight Bros

UNITED STATES PATENT OFFICE.

DAVID F. STAMBAUGH, OF ST. LOUIS, MISSOURI, ASSIGNOR OF ONE-HALF TO JAMES T. BIRCH, OF SAME PLACE.

WIRE-COILING MACHINE.

SPECIFICATION forming part of Letters Patent No. 376,685, dated January 17, 1888.

Application filed June 12, 1886. Serial No. 204,993. (No model.)

*To all whom it may concern:*

Be it known that I, DAVID F. STAMBAUGH, of the city of St. Louis, in the State of Missouri, have invented a certain new and useful Improvement in Wire Coiling Machines, of which the following is a full, clear, and exact description, reference being had to the accompanying drawings, forming part of this specification, and in which—

Figure 11:
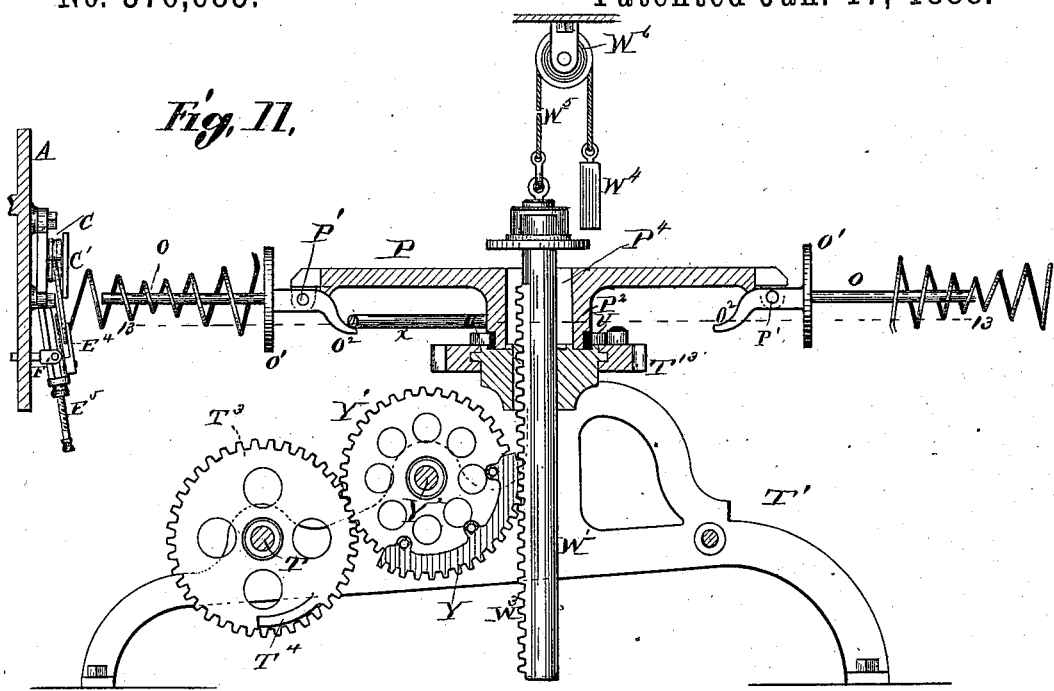
Figure 12:
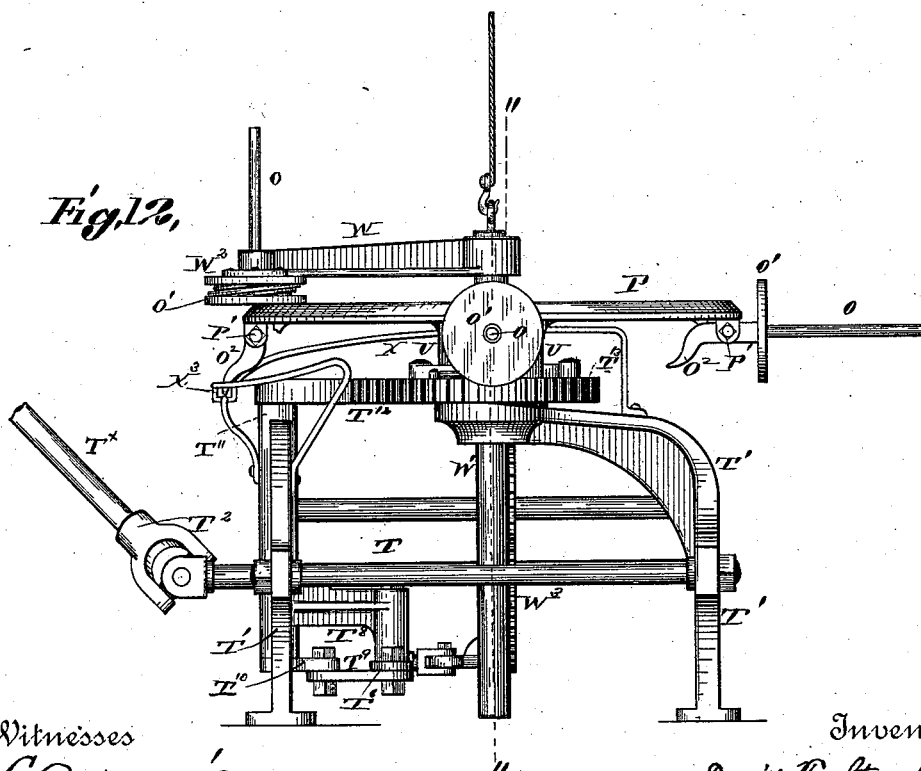
Figure 13:
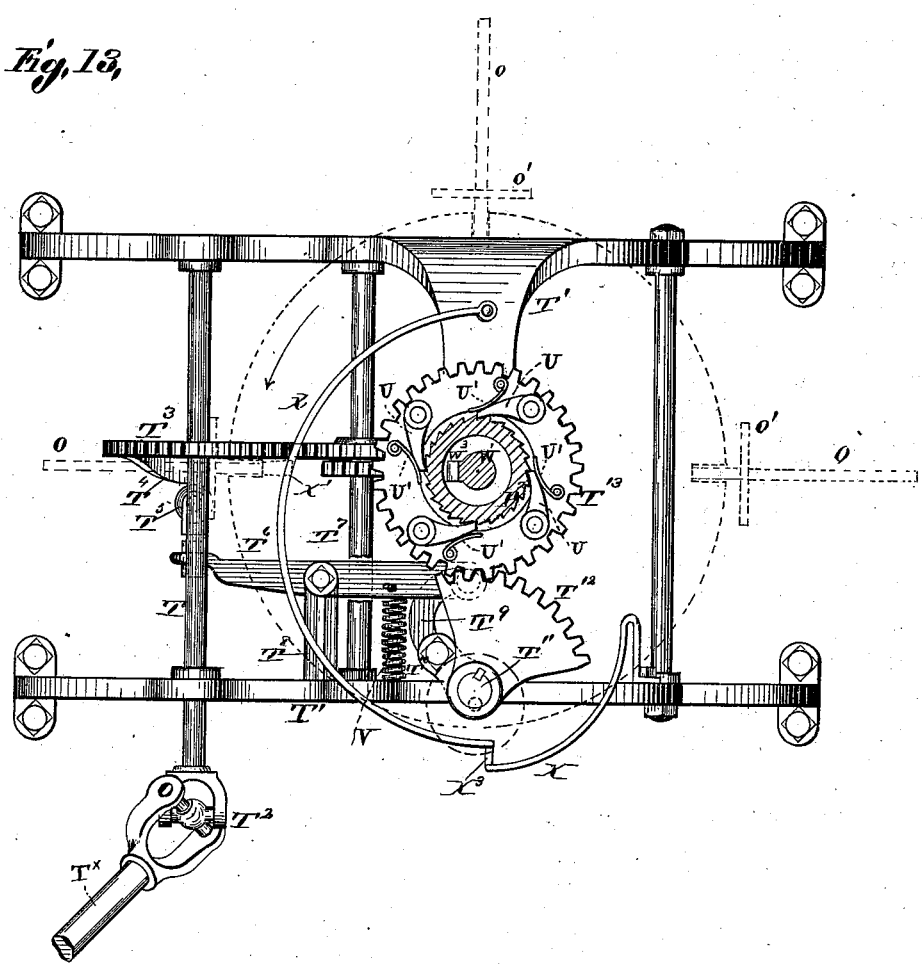

Figure 1 is a side elevation of my improved machine. Fig. 2 is a top view, part in section. Fig. 3 is an enlarged detailed view of the wire-guide. Figs. 4 and 5 are enlarged diagrams of the former and guide-rollers. Fig. 6 is a detail perspective view showing the device for giving the various spaces between the respective coils and part of the mechanism for operating it. Fig. 7 is an enlarged detail view showing the manner of making the upper feed-rollers vertically adjustable, the boxes of one of the rollers being shown, the part of the frame that guides it, and the rod that connects it to the operating-lever. Fig. 8 is a perspective view of the knives or cutters. Fig. 9 illustrates the form of spring produced on my improved machine. Fig. 10 is a detail view illustrating the connection between the frame of the guide-rollers and the frame of the former. Fig. 10½ is a section taken on line 10 10, Fig. 2, showing the manner of making the pitman or rod that operates the former adjustable. Fig. 11 is a vertical section of the device for compressing the springs after they have been formed on the machine shown in the preceding figures. This section is taken on line 11 11, Fig. 12. Fig. 12 is a side elevation of the same device, showing part of the shaft of the forming-machine and showing one of the springs compressed. Fig. 13 is a horizontal section taken on line 13 13, Fig. 11, showing the fingers that receive the springs in dotted lines, this section being taken beneath these fingers. This figure also shows part of the shaft by which this device is connected.

This device shown in these last three figures is intended to receive the springs from the forming device and, by automatically operating, compress them, as shown in Fig. 12—a process that is always necessary in making these springs—and then by a further movement of the machine the springs are released, so that they can be removed from the supporting-fingers.

My invention relates to an improved machine for making coil-springs, more particularly intended for use in upholstering, (but which may be used for various purposes;) and my invention consists in features of novelty, hereinafter fully described, and pointed out in the claims.

Referring to the drawings, A represents the frame of the machine, which may be supported on suitable legs or on a suitable base.

A' represents the main driving-shaft of the machine, provided with a pulley, $A^2$, to receive a belt, and a fly-wheel, $A^3$. Upon this shaft is a pinion, $A^4$, meshing into a similar wheel, $A^5$, fixed to a shaft, $A^x$, and gearing with a pair of independent pinions, (not shown,) one of which is secured to the shaft of each of the lower feed-rollers B. These last-named pinions in their turn gear with similar pinions, $A^6$, secured to the respective shafts B' of the upper feed rollers. These shafts are secured at their inner ends by boxes $B^2$ to the bed plate or frame A of the machine. Upon their outer ends are the upper feed-rollers B, which are located vertically over the lower feed-rollers B. These rollers are preferably grooved, as shown at $B^3$, Fig. 2, to receive the wire $B^4$, from which the springs are made. The wire in these grooves is held from lateral movement between the wheels, and as the wheels are revolved through means of the described gearing the wire is fed forward.

To cause an intermittent movement or feed of the wire, so that it will stop while the knives are cutting, I make the upper feed-rollers vertically adjustable by locating their journal-boxes between vertical guides $B^6$, on top of which are placed cross-heads $B^7$. Through these cross-heads pass vertical rods $B^8$, which are secured to the boxes of these upper rollers and which are connected at their upper ends by a cross bar or head, $B^9$, pivoted to a lever, $B^{10}$, fulcrumed at $B^{11}$ to the frame of the machine. The outer end of this lever is provided with a friction-roller, $B^{12}$, which bears upon a cam, $B^{13}$, as shown in Figs. 1 and 2. While the roller is riding upon the salient part of this cam the upper feed-rollers are held down into working position, and at this time a continuous feed of the wire is had.

When the roller, however, reaches a depression in the cam $B^{13}$, the upper feed-rollers are allowed to rise vertically a short distance under the influence of the upward pressure of the wire, and at this time the feed ceases. As soon as the roller $B^{12}$ leaves the depression of the cam, the feed-rollers will be forced downward again and the feed of the wire resumed.

The cam $B^{13}$ is secured to a shaft, $B^{14}$, journaled in boxes $B^{15}$, secured to the frame of the machine, and turned by a cog-wheel, $B^{16}$, on one end thereof, that meshes into a pinion, $B^{17}$, on a shaft, $B^{18}$, secured to the frame of the machine, and upon which is also a cog-wheel, $B^{19}$, engaged by a pinion, $B^{20}$, on the main driving-shaft $A'$. (See Fig. 2.)

From the feed-rollers B the wire passes to and between guide-rollers C, secured by suitable journals to a frame or housing, $C'$, that is in turn bolted to the frame of the machine. There is an upper and lower series of these rollers, and I have shown three rollers in each series. They are preferably grooved, as shown at $C^2$, Figs. 2 and 10, and for the same purpose as the feed-rollers B. The last guide-roller of the upper set or series is preferably made larger than the rest; but it may be the same size, if desired. The outer plate or face of the frame $C'$ is preferably made removable, so as to allow access to the guide-rollers, and I have shown it connected to the rest of the frame by screws $C^3$.

At the forward end of the frame of the guide-rollers is pivoted the former or device for giving the circular shape to the coils of the springs. This preferably consists of a frame, $D'$, in which is journaled a roller, D, preferably grooved, as shown in Fig. 2. The outer plate of the frame $D'$ is also preferably made removable to allow access to the roller D, it being secured to the remainder of the frame by screws $D^2$, as shown in Figs. 1, 4, and 5.

The frame of the former is pivoted to the frame of the guide-rollers by means of a projection, $D^3$, thereon that fits in an opening or socket, $D^4$, of the frame of the guide-rollers, and is held therein by the shaft of the lower forward guide-roller C, as shown in Fig. 10. The frame of the former is thus allowed to move in a circle or the arc of a circle from the position shown in Fig. 4 to that shown in Fig. 5, and vice versa. When it is in the position shown in Fig. 4, it will be seen that the roller D is above the center of the forward lower guide-roller C, and as the former moves to the position shown in Fig. 5 the roller D is brought beneath the center of this roller C. When the former is in its upper position, the largest diameter of the spring is formed, and as it moves from this position to its lower position the diameter of the spring is gradually decreased, as shown from the top to the middle of Fig. 9. Then, as the former recedes, moving from its lower to its upper position, the spring gradually increases in size, as shown from the middle to the bottom of Fig. 9. This action will be plainly understood by referring to Figs. 4 and 5, where it will be seen that the wire, which is shown by dotted lines, always bears against the roller D of the former, and as the roller changes its position the wire will be bent as described. The former is moved from its lower to its upper position by a spring, $D^5$, connecting a lower extension, $D^6$, of the former to the frame of the machine, as shown in Fig. 1. The former is moved from its upper to its lower position by means of a cam, $D^7$, on the shaft $B^{14}$, the cam bearing against the outer end of a pitman or rod, $D^8$, connected at its inner end to the extension $D^6$ by a pin, $D^9$, fitting in a slot, $D^{10}$, of the extension. The outer end of the pitman or rod $D^8$ is supported by a bracket or extension, $D^{11}$, of the frame of the machine, to which it is secured by a pin, $D^{12}$, fitting in a slot, $D^{13}$, of the bracket or extension. The rod or pitman is thus held in position and guided in its movement to and from the shaft $B^{14}$ as the cam operates upon it. The rod or pitman is preferably provided with a friction-roller, $D^{14}$, that bears upon the cam $D^7$. It will thus be seen that as the cam $D^7$ revolves the former will be moved from its upper to its lower position by the cam and returned by the spring $D^5$.

To increase or diminish the arc of the circle upon which the former moves, upon which depends the difference in the diameter of the convolutions, the inner end of the pitman or rod is adjusted in the slot $D^{10}$ of the extension $D^6$ by means of a set-screw, $D^{15}$, passing through the lower end of the extension $D^6$, and to cause a uniform increase or decrease in the diameter of the convolutions from end to end of the spring the pitman $D^8$ is made in two parts, connected by a block, $D^{16}$, into which the inner part of the rod is inserted and held, and through which the outer part of the rod passes, and to which it is held by a roller, $D^{17}$, the outer part of the rod being screw-threaded and entering the nut $D^{18}$.

It will be seen that upon turning the roller $D^{17}$, which is held in an enlargement of the block, the pitman will be increased or diminished in length, thus increasing or diminishing the throw or movement of the former.

From the forming-roller D the wire passes in a circle to a block or arm, E, hinged at $E'$ to the frame of the machine. This block has a reciprocating movement imparted to it by means of a lever, F, to which it is connected by means of a rod, $F'$, the outer end of the rod being connected to the block by a pin, $F^2$, working in a slot or opening, $E^2$, of the block or arm, as shown in Fig. 6. The lever F is pivoted by a pin, $F^3$, to the frame of the machine, (see Figs. 2 and 6,) a friction-roller, $F^4$, being preferably placed around the pin $F^3$, as shown. The lever is moved to cause the inward movement of the block E by means of a spring, G, and it is moved in the opposite direction by a cam, H, on the shaft $B^{14}$, the lever being provided with a roller, $F^5$, that bears against the cam. It will thus be seen that as the lever is moved by this spring and cam the block E will be moved to and from the frame of the machine on its pivot E', and the spring, bearing, as it does, against this block, will have the distances between its various coils regulated, for when the block is in its inner position there will be a less distance between the respective coils of the spring than when the block is moved to its outer position, and as the block is moved gradually from one position to the other the distances between the various coils of the springs are uniformly produced. The block E has an extension or plate, $E^4$, between which and the block the spring fits, as shown by dotted lines in Fig. 1. The movement of the block may be adjusted by regulating the arm or rod F in the slot E' by means of a set-screw, $E^5$, passing through the lower end of the block E. When the spring has been formed, it is cut off by means of a knife, I, connected to the inner end of a lever, I', pivoted to the frame of the machine by a pin, $I^2$, around which is preferably placed a friction-roller, $I^3$. The knife is moved outward by means of the spring G, which is connected to the lever I', as well as to the lever F, as described, and it is moved to its inner position by the cam H, which has an incline, H', bearing against a roller, $I^7$, for that purpose. The knife I cuts against a stationary knife, J, secured to the frame of the machine, and located near this knife is a block, J', against which the end of the spring bears as the knife cuts the wire. This block is provided with an incline, $J^2$, extending toward the stationary knife, and the office of this is to produce a bend, K, on the spring, which is a necessary feature to all upholstering springs. The bend is thus produced on the springs as the wire is cut and without any additional cost. As the wire is cut the spring bears against a support, M, secured to the frame of the machine by a bolt, M'. The position of the wire and this support as the knives come against the wire is shown in Fig. 1. As the wire passes from the reel upon which it is supported to the feed-rollers B it passes through a guide-tube, N, the end of which is turned so as to be presented toward the reel, as shown in Fig. 3. The wire passing through this guide-tube is taken uniformly from the reel and is presented in line with the feed-rollers, so as not to be liable to be thrown from the grooves in the roller. The guide-tube is secured to the frame of the machine by a bracket, N', into which it enters and is held by a screw, $N^2$.

The length of time during the elevation of the upper feed-rollers, or, in other words, the length of time the wire is allowed to stop moving forward or remain at rest, may be regulated by the depression or by the length of the depression in cam $B^{13}$, for it will be understood that the longer this recess is the longer the upper feed-rolls will remain in upper position, and consequently the wire will remain longer at rest upon each revolution of cam $B^{13}$. To give a like "rest" to the wire between the ends of each spring—say at the middle—I form another depression, $B^{31}$, in cam $B^{13}$, (see dotted lines, Fig. 1,) and as the wire is not fed forward when the feed-rollers are in upper position, as stated, no wire is fed to form the spring during the movement of the cam when this depression $B^{31}$ is at the roller $B^{12}$ of the lever $B^{10}$. The longer the time the wire remains at rest the less wire will be in each spring, and the shorter the time the wire remains at rest the more wire will be in each spring, so that it follows by increasing or diminishing the size of depression $B^{31}$ the amount of wire in each spring will be regulated so that any number of spring—as No. 1, 2, 3, 4, 0—may be produced. As the springs are formed, they slip over arms or fingers O, provided with disks O' at their inner ends and pivoted at P' to a table, P. There are a number of these fingers or rods O, and they are brought, by turning the table P, into line with the springs, the table being turned each time a spring is cut off, so that this spring is moved out of the way and another rod or arm is presented in front of the machine to receive the next spring as it is formed, the turning of the table, of course, being so timed or geared as to move just at the proper time to produce this result. I have shown it turned by the following means:

T represents a shaft journaled in a frame, T', and which is connected by a suitable joint or coupling, $T^2$, to a shaft, $T^x$, which may in turn be coupled to the shaft $B^{14}$ of the coiling-machine. On the shaft T is secured a cog-wheel, $T^3$, provided with a cam, $T^4$. This cam $T^4$ bears against a friction-roller, $T^5$, connected to one end of an arm or lever, $T^6$, pivoted at $T^7$ to a projection, $T^8$, formed upon or secured to the frame T'. The inner end of this lever $T^6$ is connected by an arm or link, $T^9$, to a crank, $T^{10}$, on a vertical shaft, $T^{11}$, secured to the frame of the machine.

On the shaft $T^{11}$ is a cog-segment, $T^{12}$, meshing into a cog-wheel, $T^{13}$, which is provided with pivoted dogs U, which are held against a downwardly-extending hub, $P^2$, formed upon or secured to the table. The dogs are held against this hub by springs U', so that when the wheel $T^{13}$ is turned in the direction shown by the arrow, Fig. 13, the table will be turned, and when the cog-wheel is turned in the opposite direction the table will not be turned, but the dogs will slip over hub $P^2$. The wheel is turned in this opposite direction by means of the segment $T^{12}$, which is turned to its normal position, after being operated by the lever $T^6$ and its connections, by means of a spring, V, connecting the lever $T^6$ to the frame T', as shown in Fig. 13. Thus the table is given an intermittent movement to bring the fingers or rods O in line with the springs as they are formed, as above stated, and this movement takes place just at the proper time, as also above stated.

It will be seen that the fingers or rods are in a horizontal position when they receive the springs. They are changed from this position into a vertical position directly after they have received the springs, to permit the springs to be pressed by means of an arm, W, on a vertical movable shaft or rod, W', working up and down in the center of the frame T'. The outer end of the arm W is provided with a disk, $W^2$, which is perforated, and the arm is likewise perforated to fit over the fingers O, as shown in Fig. 12. The springs are thus pressed (as it has always been necessary to press such springs) between the disks $W^2$ and O'. The fingers are turned from a horizontal to a vertical position by means of a horizontal cam, X, secured to the frame D, as shown in Fig. 13. As the table turns the inner projecting ends $O^2$ of these fingers engage with the cam at a point, X', Fig. 13, which causes the fingers to be moved to a vertical or upright position, the cam forcing outward on the lower ends $O^2$ of the fingers. When the fingers have thus been moved to an upright position, the arm W is made to descend, as described, by means of a cog-segment, Y, meshing into a rack, $W^3$, of the shaft W'. This segment is formed upon a cog-wheel, Y', supported on a shaft, $Y^2$, and which meshes into a cog-wheel, $T^3$, on the shaft T. A continuous revolution is had of the cog-wheel $T^3$, and the segment Y comes against the rack $W^3$ at the proper time to cause the downward movement of the rod W' to do the pressing. When the segment Y has left the rack $W^3$, the shaft W' and arm W are raised to their upper position by a weight, $W^4$, connected to the shaft W' by a rope or wire, $W^5$, passing over a pulley, $W^6$. The table P has an enlarged opening, $P^4$, in its center, so that it can revolve independently of and not move the shaft W'. After the spring has been pressed and the arm W has raised, the further turning of the table will cause the inner ends $O^2$ of the fingers O to pass through an opening, $X^3$, of the cam X, formed by a bend in the cam, and then the fingers will be thrown down to their horizontal position by means of the cam, which will then bear on the other side of the extension O'. The operation of the fingers and the pressing is thus automatic, and this part of the machine being geared to the other part causes it to work without attention or care, it being automatic throughout in its operation. When the fingers have dropped into their horizontal position after the springs are pressed, the springs are removed or taken off and are in condition for use.

I claim as my invention—

1. In a wire-coiling machine, in combination with the lower feed-rollers, the upper feed rollers, made vertically movable, a pivoted lever operated by a recessed cam, and connection between the upper rollers and the lever, substantially as shown and described, for the purpose set forth.

2. In a wire-coiling machine, in combination with the lower feed-rollers, the upper feed-rollers, and the boxes in which they are journaled, made vertically movable, a pivoted lever operated by a recessed cam, a cross-head carried by said lever, and pins connecting the cross-heads with the boxes, substantially as shown and described, for the purpose set forth.

3. In a wire-coiling machine, in combination with the feed-rollers, the guide-rollers journaled in a frame or housing, and a former pivoted concentrically with one of the guide-rollers, and means for operating the former, substantially as and for the purpose set forth.

4. In a wire-coiling machine, the combination, with the feed-rollers, of an independent set of idle guide-rollers located in a suitable housing, a pivoted former located at the forward end of the guide-rollers, and mechanism for operating the former, substantially as shown and described.

5. In a wire-coiling machine, the combination, with the guide-rollers and the former, of a pitman adjustable in length and adjustably secured to said former at one end, and a cam engaging the other end of said pitman, substantially as shown and described.

6. In a wire-coiling machine, in combination with the guide-rollers, the former made substantially as described and provided with a slotted extension, the pitman secured to the extension and made adjustable therein, and a cam for operating the pitman and former, substantially as shown and described, for the purpose set forth.

7. In a wire-coiling machine, in combination with the guide rollers, the pivoted former provided with a slotted extension, the pitman connected to the extension, a set-screw for making the pitman adjustable in the extension, a spring, and a cam for operating the former and pitman, substantially as shown and described, for the purpose set forth.

8. In a wire-coiling machine, in combination with the guide-rollers and former, the pivoted oscillating block E, substantially as shown and described, for the purpose set forth.

9. In a wire-coiling machine, in combination with the guide-rollers and former, the pivoted oscillating block E, provided with a plate, $E^4$, substantially as shown and described, for the purpose set forth.

10. In combination with the guide-rollers and former, the pivoted block E, and mechanism for operating it, consisting of a lever to which the block is connected by a rod, and a cam for operating the lever, substantially as shown and described, for the purpose set forth.

11. In a wire-coiling machine, in combination with the guide-rollers and former, the pivoted block E, the lever and rod for operating the block, and the set-screw for adjusting the rod in the block, substantially as shown and described, for the purpose set forth.

12. In a wire-coiling machine, in combination with the guide-rollers, the former, and stationary knife, of the movable knife, a pivoted lever connected therewith, a spring for holding said knife in retracted position, and a cam for operating it, substantially as and for the purpose described.

13. In a wire-coiling machine, in combination with the frame A, the guide-rollers C, and the former, the inclined block J', fixed to the frame, the jaw J of the cutter, fixed at the lower inclined edge of said block, and the movable jaw I, substantially as and for the purpose set forth.

14. In a wire-coiling machine, in combination with the guide-rollers and former, the knives for cutting the wire, and support M, for holding the spring as the wire is cut, substantially as set forth.

15. The combination, with a wire-coiling machine, of a table having fingers, one of which receives each spring automatically as it is formed, and means for partially rotating said table after the formation of each spring, so as to carry away the spring last formed and present another finger for the reception of the next spring to be formed, and means for compressing the springs on said fingers, substantially as set forth.

16. In a wire-coiling machine, in combination with mechanism for forming the springs, mechanism for compressing the springs, consisting of fingers, a revolving table by which they are supported, and a movable arm for compressing the springs on the fingers, substantially as and for the purpose set forth.

17. In a wire-coiling machine, in combination with mechanism for forming the springs, mechanism for compressing the springs, consisting of fingers pivoted to a movable table, a cam for raising the fingers from a horizontal to a vertical position, and an arm for compressing the springs on the fingers, substantially as and for the purpose set forth.

18. In a wire-coiling machine, the combination, with mechanism for forming the springs, of mechanism for compressing them, consisting, essentially, of a table provided with fingers, means for causing the intermittent movement of the table to which the fingers are secured, and mechanism for compressing the wire on the fingers, substantially as and for the purpose set forth.

19. In a wire-coiling machine, in combination with mechanism for forming the springs, mechanism for compressing the springs, consisting of fingers, the movable table to which the fingers are pivoted, levers, cog-wheels, and pivoted dogs for operating the table, an arm for pressing the springs on the fingers, and mechanism for operating the arm, consisting of a rack, segment, cog-wheels, and shaft, substantially as set forth.

20. The combination, with an intermittingly-moving table carrying fingers, substantially as described, of an arm or follower and mechanism for reciprocating it during the intervals in which the table remains at rest, substantially as set forth.

21. The combination, with the rotary disk P, having the fingers O pivoted thereto, of a cam for moving said fingers from a horizontal to a vertical position, a follower for compressing the spring on said fingers, and a second cam for throwing said fingers again into horizontal position, substantially as set forth.

22. The combination, with the fingers O, of the arm or follower W, a weight for holding it normally in elevated position, a rack-bar, W', projecting from said arm or follower, and a segmental pinion for reciprocating said rack-bar, substantially as set forth.

23. In a wire-coiling machine, the combination, with the lower feed-rollers, of the vertically-movable upper feed-rollers, a pivoted lever, connection between the upper rollers and the lever, and a cam for operating said lever, substantially as and for the purposes set forth.

24. The combination, with the movable feed-rollers, of a lever having connection therewith, and means for operating said lever to cause the intermittent feed of wire, substantially as set forth.

25. Mechanism for compressing springs, consisting of a rotating device provided with fingers for successively presenting the springs to the compressing-head, in combination with a compressing-head and means for moving it against the spring.

DAVID F. STAMBAUGH.

In presence of—
  JAMES T. BIRCH,
  GEO. H. KNIGHT.